Figure 1:
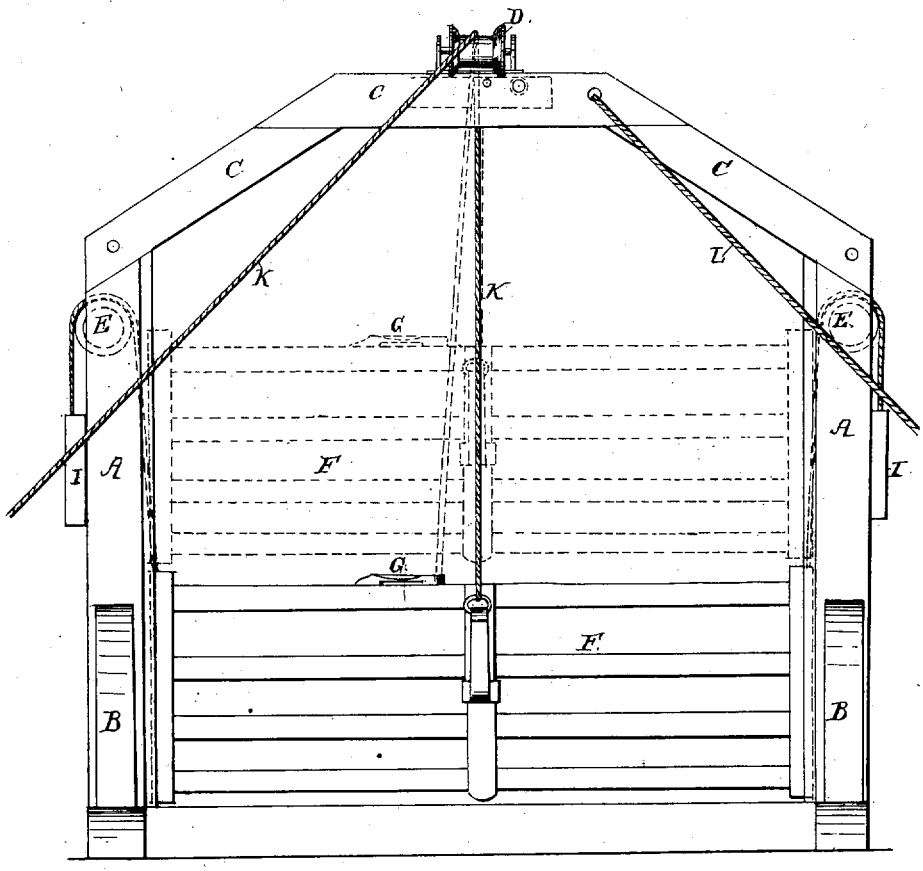

2 Sheets—Sheet 1.

T. F. HALL,

Assignor to L. FLAGG.

Farm Gate.

No. 9,569. Reissued Feb. 15, 1881.

Attest,

Joseph C. Wildman

D. P. Lowe

Inventor,

Thomas F. Hall by Hannay & Brock

Attys.

N. PETERS, PHOTO-LITHOGRAPHER, WASHINGTON, D. C.

2 Sheets—Sheet 2.
T. F. HALL,
Assignor to L. FLAGG.
Farm Gate.
No. 9,569. Reissued Feb. 15, 1881.
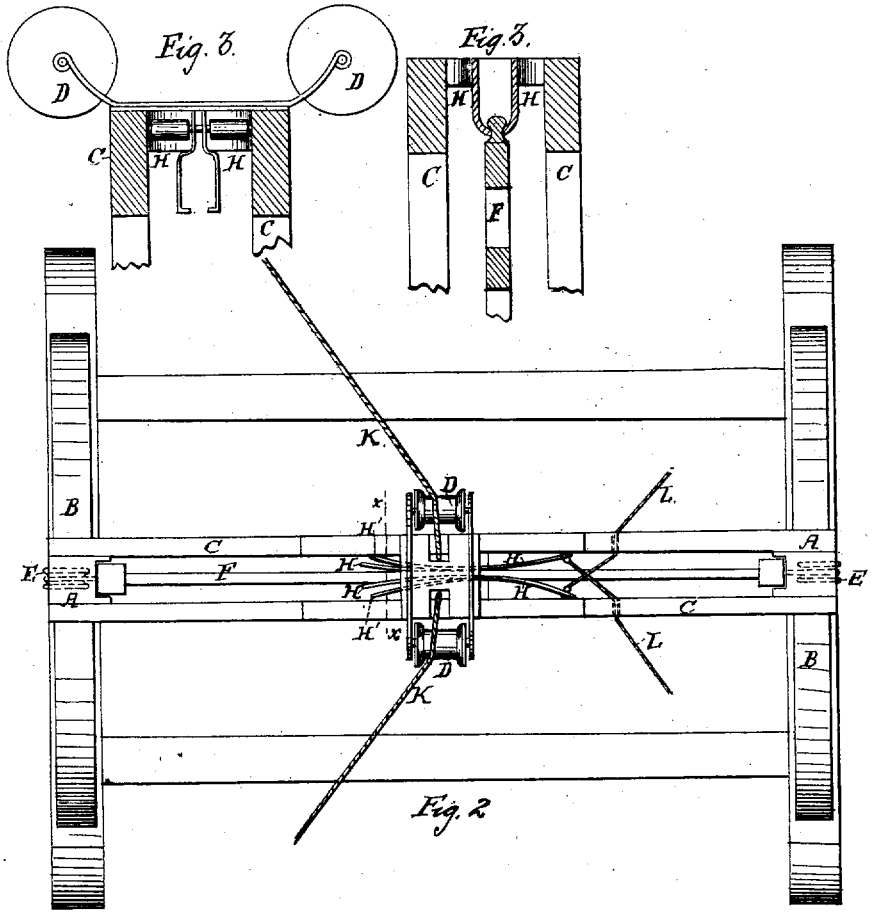
Inventor:
Thomas F. Hall
by Hanway & Brock
Attys
Attest:
Joseph C. Wildman
D. P. Cowl.
N. PETERS, PHOTO-LITHOGRAPHER, WASHINGTON, D. C.

UNITED STATES PATENT OFFICE.

THOMAS F. HALL, OF ASHVILLE, OHIO, ASSIGNOR TO LYSANDER FLAGG, OF CENTRAL FALLS, RHODE ISLAND.

FARM-GATE.

SPECIFICATION forming part of Reissued Letters Patent No. 9,569, dated February 15, 1881.

Original No. 90,839, dated June 1, 1869. *Application for reissue filed November 17, 1880.

*To all whom it may concern:*

Be it known that I, THOMAS F. HALL, of Ashville, in the county of Pickaway and State of Ohio, have invented certain new and useful Improvements in Gates; and I do hereby declare that the following is a full and exact description of the same, reference being had to the accompanying drawings, making part of this specification, in which—

Figure 1 is a front elevation. Fig. 2 is a top view; and Fig. 3 is a section on line *x x* of Fig. 2.

My invention relates to that class of gates which are arranged to rise and fall vertically; and the invention consists in certain combinations of devices whereby such gates can be easily and conveniently operated, as hereinafter more fully set forth.

Referring to the drawings, A represents the vertical posts of the frame-work, and B braces for same. The tops of the posts are connected by cross-timbers or archway C C. At the center of the arch or cross-timbers C pulleys D are mounted, to be used for the purpose hereinafter set forth. There are also pulleys E E, located, respectively, near the top and in the vertical center of each post.

The gate F may be made of horizontal bars and vertical slats, or in any other convenient style. The ends are fitted to run in grooves or guideways formed on the inner sides of the vertical posts of the frame-work.

A catch, G, of any convenient form, may be placed upon the top of the gate and secured near the middle, and when it is desired to retain the gate in an elevated position this catch engages between two springs, H H, which are located between the pulleys at the top of the arch or cross-timbers of the frame-work.

H′ H′ are springs, which are arranged so as to bear upon the springs H H, near the points where they grasp the clutch G, so as to insure the holding of the gate in such elevated position, when desired, by the springs H H, until it is released by the pulling on the cord L.

I I are counterbalance-weights, from each of which a chain or cord passes over the pulleys E and is attached to the gate. Cords or chains K are also attached to the gate and passed over the pulleys D, their ends passing downward to a point or points convenient for operation. By pulling on either of these ropes or chains the gate will be raised, as shown by dotted lines, Fig. 1, of the drawings, and when it is desired to retain the gate in an elevated position it is carried up until the catch G engages with the springs H H, where it is held until released. To release the gate from such position cords or ropes L are employed, a pull on one or other of which releases the catch G from the springs H H and allows the gate to descend.

When the gate is not carried up far enough to engage with the catch G the employment of the ropes or cords L will, of course, be unnecessary to lower the gate.

What I claim as my invention is—

1. The combination of a vertically-sliding gate having an elevated position when open, with two equal counterbalance-weights attached thereto, arranged upon a superstructure and on each side of the gate, and with mechanism, substantially as described, for raising and lowering the gate from a convenient point or points, substantially as set forth.

2. The combination of a vertically-sliding gate having an elevated position when open, with two equal counterbalance-weights attached thereto, arranged upon a superstructure and on each side of the gate, and with mechanism, substantially as described, for raising and lowering the gate and for retaining the gate in an elevated position, substantially as described.

3. The vertically-sliding gate F, having an elevated position when open, provided with two equal counterbalance-weights arranged upon the superstructure and on each side of the gate, in combination with pulleys D D, arranged upon the gate-frame, and the ropes K, as set forth, whereby the gate may be operated from a convenient point near each side of the gate.

4. The combination of the vertically-sliding gate F, having an elevated position when open, provided with two equal counterbalance-weights arranged upon the superstructure on each side of the gate, and with the post A, arch C, pulleys D D, and ropes K, arranged for operation at a point adjacent to each side of the gate, as specified.

5. The combination of vertically-sliding gate F, having an elevated position when open, and its frame, the catch G, pulleys D, springs H H, and ropes K L, substantially as set forth.

THOMAS F. HALL.

Witnesses:
G. G. BRINTLINGER,
MELISSA BRINTLINGER.